(12) United States Patent
Derocher et al.

(10) Patent No.: US 8,223,186 B2
(45) Date of Patent: Jul. 17, 2012

(54) USER INTERFACE FOR A VIDEO TELECONFERENCE

(75) Inventors: Mike Derocher, North Albany, OR (US); Ted Beers, Corvallis, OR (US); Thomas Kleist, London (GB); Thomas Moltoni, Norbury London (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1478 days.

(21) Appl. No.: 11/742,490

(22) Filed: Apr. 30, 2007

(65) Prior Publication Data

US 2007/0279484 A1 Dec. 6, 2007

Related U.S. Application Data

(60) Provisional application No. 60/803,584, filed on May 31, 2006, provisional application No. 60/803,588, filed on May 31, 2006.

(51) Int. Cl.
*H04M 11/00* (2006.01)
(52) U.S. Cl. ..................................... 348/14.01; 709/204
(58) Field of Classification Search .... 348/14.01–14.04, 348/14.1, 14.11, 14.07–14.09; 379/93.17–93.21, 379/202; 345/716, 718, 744, 753, 758; 370/260–261; 709/204
See application file for complete search history.

(56) References Cited

U.S. PATENT DOCUMENTS

| | | | |
|---|---|---|---|
| 5,872,922 A | 2/1999 | Hogan et al. | |
| 5,974,382 A * | 10/1999 | Fado et al. | 704/270 |
| 5,999,208 A * | 12/1999 | McNerney et al. | 348/14.08 |
| 6,025,871 A | 2/2000 | Kantor et al. | |
| 6,798,427 B1 * | 9/2004 | Suzuki et al. | 84/604 |
| 6,853,398 B2 * | 2/2005 | Malzbender et al. | 348/14.09 |
| 7,068,299 B2 | 6/2006 | Lemieux et al. | |
| 7,092,002 B2 | 8/2006 | Ferren et al. | |
| 7,119,829 B2 * | 10/2006 | Leonard et al. | 348/14.16 |
| 7,133,062 B2 | 11/2006 | Castles et al. | |
| 2003/0142202 A1 | 7/2003 | Bowman | |
| 2004/0165060 A1 * | 8/2004 | McNelley et al. | 348/14.08 |
| 2006/0132595 A1 * | 6/2006 | Kenoyer et al. | 348/14.08 |

* cited by examiner

*Primary Examiner* — Curtis Kuntz
*Assistant Examiner* — Maria El-Zoobi

(57) ABSTRACT

A method is described for initiating and controlling a video conference between multiple video conference studios. A virtual meeting space is defined within a user interface comprising icons representing selected remote studios in geometric positions that mimic the locations of separate live video images coming from the selected remote studios, enabling participants in the local studio to naturally associate the live video images with the icons representing the remote studios.

22 Claims, 8 Drawing Sheets

USER INTERFACE FOR A VIDEO TELECONFERENCE

PRIORITY CLAIM

This application claims the benefit of U.S. Provisional Patent Application Ser. No. 60/803,584, filed on May 31, 2006 and U.S. Provisional Patent Application Ser. No. 60/803,588, filed on May 31, 2006, each of which are incorporated by reference in their entirety herein.

BACKGROUND OF THE INVENTION

Collaboration events such as conventional internet-based video conferences have typically provided an unsatisfactory experience for participants. Attendees have been presented to each other in an unnatural fashion, such as a series of disassociated bodies on a display monitor. In most video conferences, each attendee's geometric presentation is different from the geometric presentation of other attendee's. Interactions between attendees with different local environments, as a result, have not appeared natural because of the lack of correspondence between what each set of interacting attendees see.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

In accordance with one aspect of the invention, it has been recognized that a system and method is needed for initiating and controlling a video conference collaboration event between a plurality of video teleconference studios. The system enables attendees to have a "blended space" for video conference collaboration events or video teleconferences that combines a local physical environment of one set of attendees with respective apparent spaces of other sets of attendees that are transmitted from two or more remote environments. By aligning video streams and positioning cameras, the remote environments can be represented in the local physical environment in a fashion that allows for natural collaboration cues, such as eye contact and directional gaze awareness, to be maintained between the local set of attendees and one or more sets of remote attendees. The resulting blended space can naturally extend the local physical environment to be consistent with the remote environments. Similarly, the remote environments can view a blended space that displays the local environment and maintains the natural feel of each environment. In this manner each blended space allows for each set of attendees, whether local or remote, to experience natural collaboration cues such as sufficient eye contact and gaze awareness.

Even with similar environments that lead to the blended space, viewing a plurality of video teleconference studios in a local studio can still be disassociating compared to a face to face meeting. In an in-person meeting, an attendee can have a spatial awareness of the other attendees in the room. In other words, an attendee in a face to face meeting can naturally understand his physical relation to the other meeting participants. In a video teleconference that includes a plurality of studios, however, it can be difficult to relate other attendees' locations and identities. A local participant must decipher which remote studio is displayed at each display location in the local studio, as well as the identity of the meeting participants in each display.

A user interface can be configured by a computer readable program code embedded in a non-transitory computer readable medium, to provide attendees a spatial awareness of the display location of remote studio(s). The user interface can have icons representing the local and remote studios in a virtual meeting space. The icons can be geometrically displayed within the user interface to mimic the layout of each studio. The user interface can be used by meeting attendees to gain a spatial awareness that can reduce the disassociation typically present in a teleconference with a plurality of remote studios.

Figure 1:
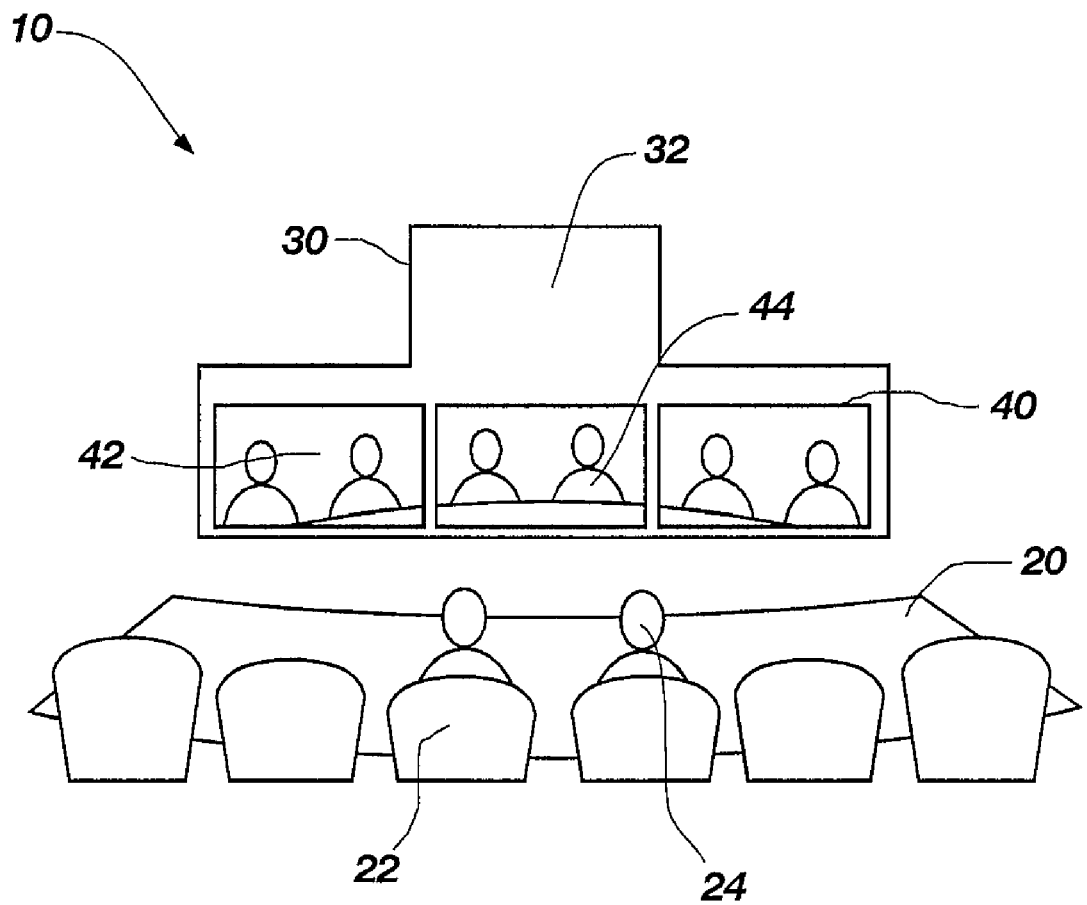
FIG. 1 is a perspective view of one embodiment of a blended space video conference studio.

As illustrated in FIG. 1, a local video conferencing studio, indicated generally at 10, is an example implementation of a video conference collaboration studio which is used in the creation of a blended space for local attendees 24 present in the video conference studio. The local attendees can be seated in chairs 22 which are positioned to one side of a conference table 20. The conference table may be of a different size than the six-seat table illustrated. However, a similarly sized conference table is typically maintained at each of the local and remote locations.

A series of video displays, referred to as people displays 40, can be located opposite the conference table. In the example implementation illustrated in FIG. 1, there are three people displays located in a single row, however the people displays may be located in any desired position. The people displays are used to display video images 42 from remote video conference studios that are similar in configuration to the local video conference studio. Furthermore, the people displays can be large enough to display images of remote attendees 44 with life-size likenesses when the field of view of the video image from the remote studio is appropriately narrowed.

The local and remote studios can be configured in a similar fashion to enhance the effect of the blended space environment. For example, in one embodiment the conference table for each studio can be slightly curved, and camera angles can be configured to include the curved tabletop in the lower portion of each video image. By aligning the curved sections across each people display, the affect of being in the same meeting space is amplified, despite attendees possibly being thousands of miles apart geographically. Other factors such as the background, lighting, camera positioning, audio calibration and microphone speaker locations can be taken into account to maintain similar environments at each remote location that provide substantially similar images in each people display and allow for natural collaboration cues, such as eye contact and directional gaze awareness, to be maintained between each set of attendees.

To facilitate the operation and control of the blended space environment, a control display 30 can be mounted adjacent the people displays. The control display can also be incorporated in a table-top display. For example, the control display may be a laptop or a table top display having touch-sensitive controls. A User Interface ("UI") 32 can be presented on the control display to enable an attendee to initiate, control, and monitor the video images and audio feeds received from select remote video conferencing studio locations. In one embodiment, the UI can simplify the blended space concept to meeting participants by employing animated sequences that provide attendees with an image of connecting virtual tables representing remote studios to a local table icon representing the local studio in the user interface. The animated sequence can be used to explain to attendees the process and progress of their studio and others joining into a virtual teleconference. The animation can provide feedback to the initiator that the connection sequence for each selected remote studio is underway. The animation can also provide feedback that the connection is completed. Moreover, the graphical representations for each studio can geometrically correspond with the people displays upon which a video image of those studios is programmed to appear once the connection process is completed.

Figure 2:
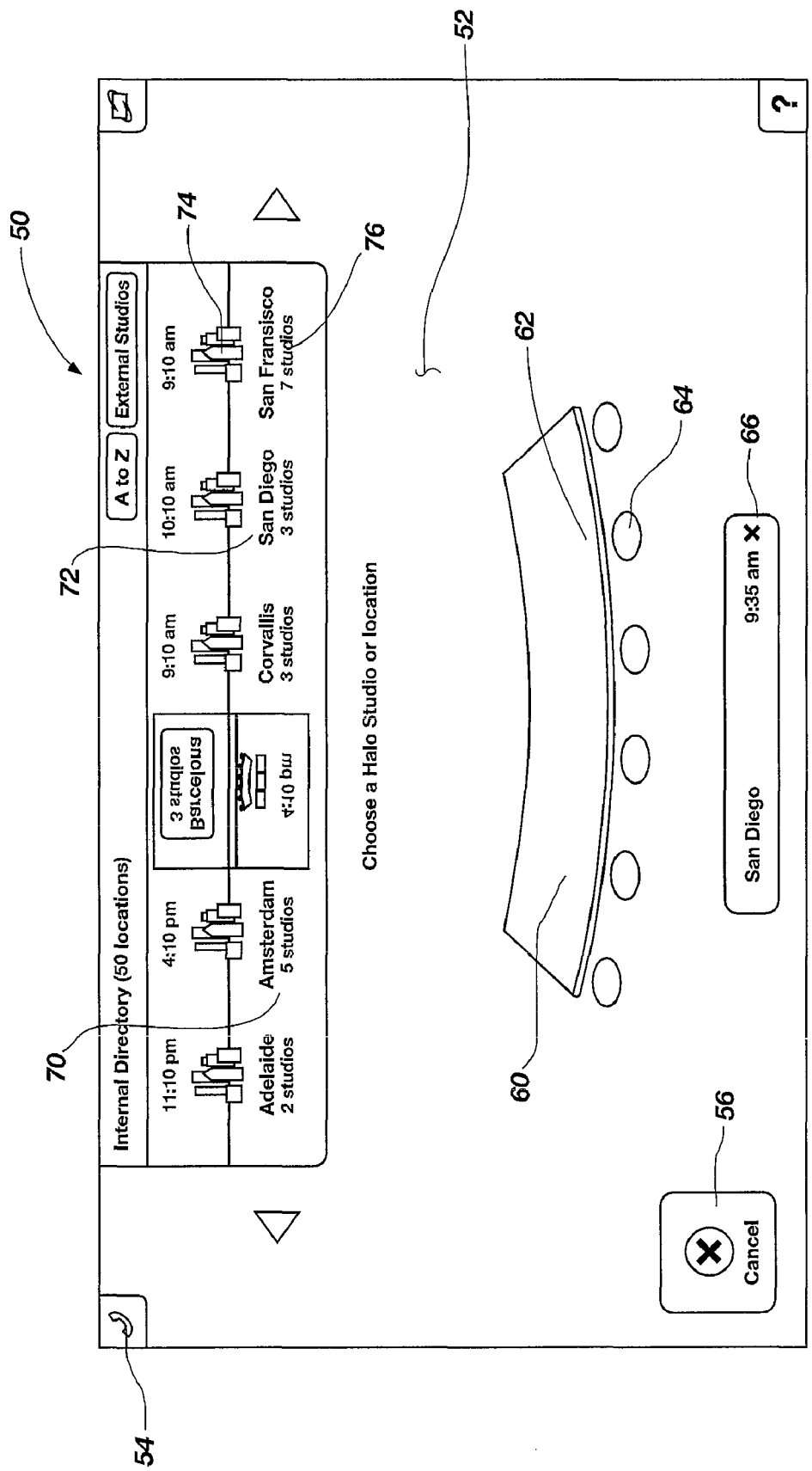
FIG. 2 illustrates the initiation of a video conference collaboration event within a User Interface according to an exemplary embodiment of the present invention.

The UI 50, as shown in FIG. 2, provides a graphical representation of the local studio's conference table. The graphical representation is referred to as the local studio icon 60. The local studio icon can have an appearance and shape similar to the local studio's conference table. In the view shown in FIG. 2, the local studio icon can be positioned in a front and center location, consistent with the natural perspective of a local participant in the local studio. In an exemplary embodiment of the present invention, the local studio icon is given a sense of direction by curving the tabletop 62 and adding a number of seat icons 64 to one side of the table, mimicking the curve and configuration of the conference table and chairs physically present in the local studio. A location text graphic 66 can be positioned adjacent the local studio icon to display a location and time of the local studio.

In keeping with the philosophy of the blended space environment, the appearance of the UI 50 can be centralized by locating control icons 54 or action buttons 56 in the corners or around the periphery of the UI, devoting the center portion of the UI to the presentation and development of the virtual meeting space. This intuitive space has proven to be very successful in end-user training for implicitly training users on how to look for controls. The main video conferencing tools can be made accessible by moving a mouse icon towards to the control icons. System messages can be designed to appear near the control icons to facilitate communication with the user.

A collaboration event can be initiated in the UI by selecting a remote studio location 72 from a video conferencing directory 70. The video conferencing directory uses icons 74 to define major geographic locations. When multiple collaboration studios have been set up at a particular geographic location, it employs a drill-down capability, otherwise known as "dynamic event blended space topology", to select from among the multiple studios located around the same geographic location. The dynamic topology data 76 can be displayed below the iconic directory of geographic locations to provide dynamic, real-time status and availability information for studio locations that may be added to the meeting. Meeting initiators can use the dynamic topology information to select the desired studio location from the video conferencing directory.

Figure 3:
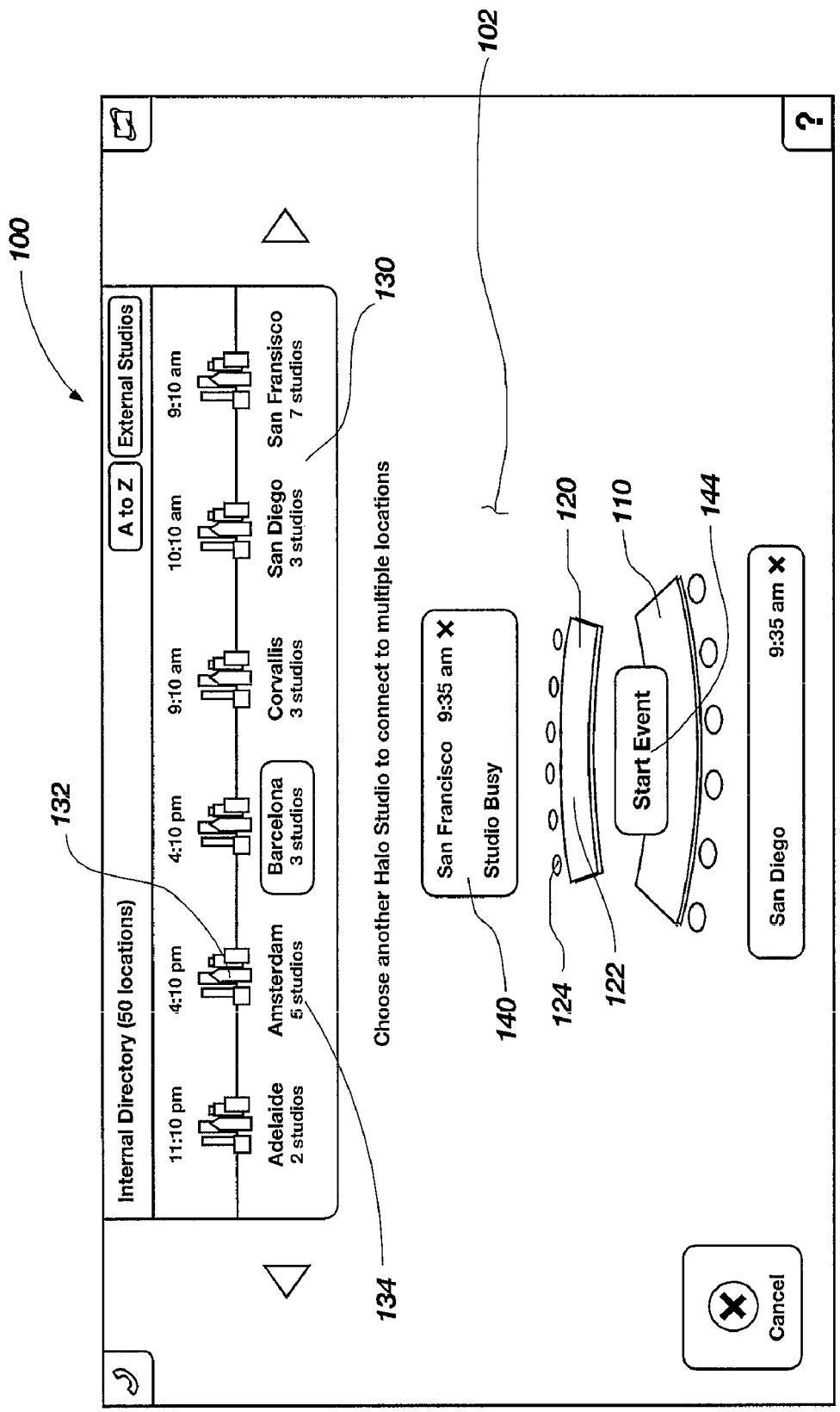
FIG. 3 illustrates the selection of a first remote video conference studio within the User Interface, in accordance with an embodiment of the present invention.

After a first remote studio is selected from the video conferencing directory, the UI 100 can be updated, as shown in FIG. 3, to display a remote studio icon 120 opposite the local studio icon 110. In an exemplary embodiment the remote studio icon also has a curved tabletop 122 and seat shapes 124, and is orientated such that the local studio icon and remote studio icon face each other, forming the virtual meeting space 102. Also in an exemplary embodiment, a location text graphic 140 is positioned adjacent the remote studio icon to identify the collaborating studio. Information pertaining to the remote studio's location, its local time, and its connection status or availability may also be presented on the location text graphic. The location text may be presented in a separate graphic, as shown, or it may be displayed on the remote studio icon itself or in any otherwise relevant location and still fall with the scope of the present invention The location text graphic can also be used to show status of individual remote in-studio tools and other types of connections. For example, a sharing tool may be displayed to enable participants to share digital information. A connection tool may be used to show when a phone is in-use. The text graphic may also be a tab. The tab can also be used to disconnect an individual studio from the meeting. The tab may be a drag and drop type of graphic, enabling a meeting participant to drag and drop the location tab to change a relative location of the participants in the displays.

As illustrated in FIG. 3, the virtual meeting space can be viewed with a 3D perspective view, or personal view, to provide participants a more realistic spatial representation of the virtual meeting that mimics the configuration of tables and chairs located in the studio. The virtual meeting space may be presented in the UI using any form of abstract icons and from any perspective, so long as the meeting participants can associate the location of the remote studio icons in the UI with the location of the video images in the local studio originating from the corresponding remote video conference studio.

From the UI shown in FIG. 3, the meeting organizer has the option of initiating a traditional two-point video conference event with a first remote studio by selecting the appropriate action button 144, or adding additional remote studios to form a multipoint event using the video conferencing directory 130. As with selecting the first studio, the meeting organizer may use the dynamic topology information 134 when choosing from multiple remote studios at the various geographic locations 132.

Figure 4:
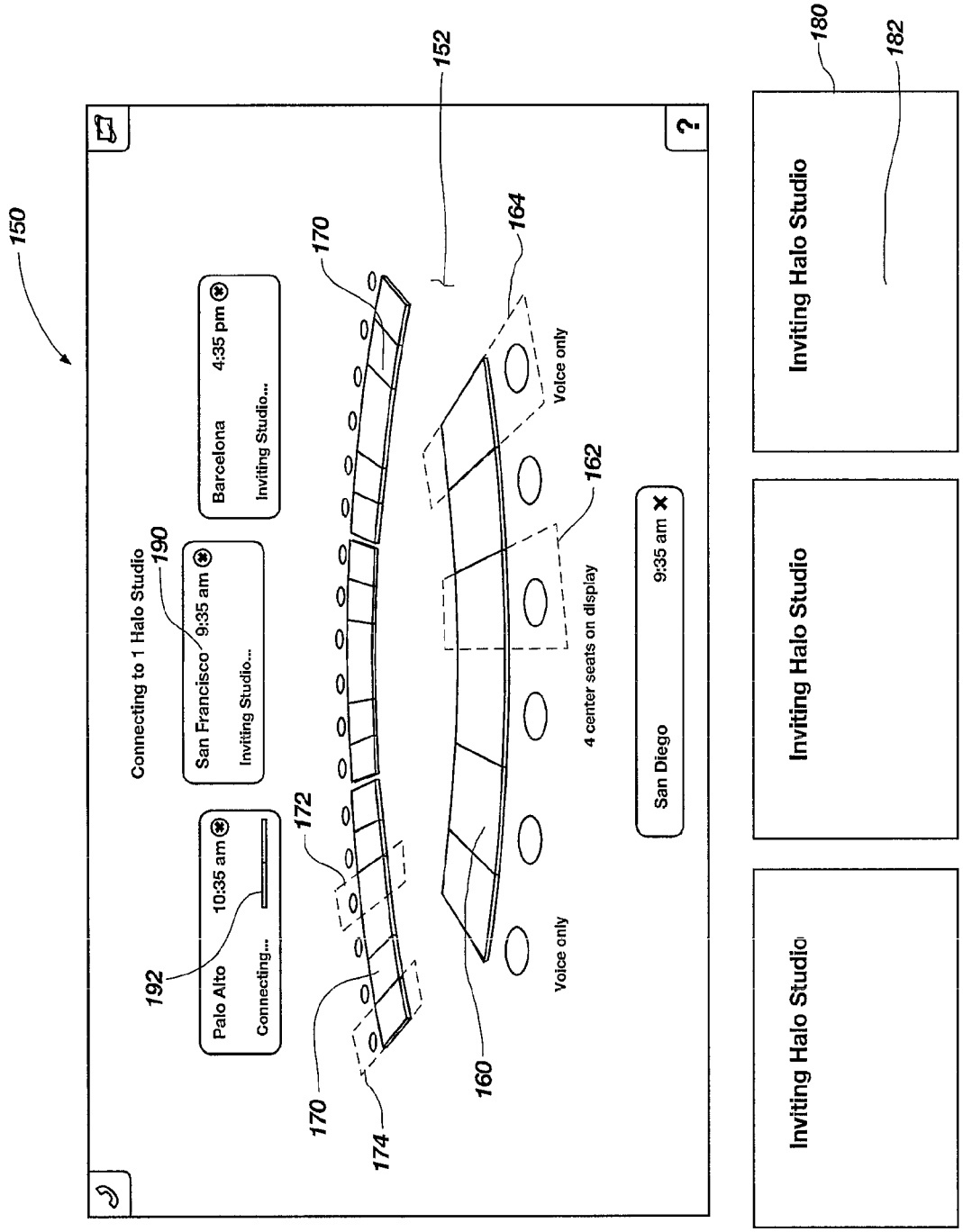
FIG. 4 illustrates the selection of multiple remote video conference studios within the User Interface, in accordance with an embodiment of the present invention.

FIG. 4 illustrates the UI 150 in an embodiment comprising a multipoint event with two additional remote collaboration studios selected by the meeting organizer. As soon as the remote studios for the multipoint event are selected, two additional remote studio icons 170 are added to the virtual meeting space 152. With the meeting configured with three remote studios as illustrated, the UI can provide animated sequences. The animated sequences can be configured to show a connection of the three remote studio icons to the local studio icon 160 to provide a visual explanation to attendees of the process and progress of the remote studios joining into a blended space teleconference. In an exemplary embodiment of the present invention, the virtual tables comprising the remote studio icons are animated to form a long, sectioned table opposite the local studio icon 160. Furthermore, the positions of the three virtual tables align with the physical positions of the three people displays 180 mounted below the control display 30 (FIG. 1). It should be noted that when no studio is connected to a screen, a static studio view can be displayed that can include explanatory text to 'fill' the void and maintain a sense of immersiveness.

Location text graphics 190 also appear in the UI in geometric positions associated with each new collaboration studio icon. During the connection process, the location text graphics provide invitation and connection status information 192 between the remote and local studios. FIG. 4 illustrates the state of the UI after studio selection but prior to connection to the remote studios. Prior to connection, the people displays can be active but typically show video images 182 of an empty studio to indicate that the remote studio is in the process of being invited or connected.

Depending on the configuration of the remote studios, the people displays in the local studio may not adequately display all the occupied positions at the remote conference table and still maintain the blended space environment. For example, each of the three people displays shown in FIG. 4 have a selected size and configuration capable of showing four out of the six standard conference table positions available in each remote studio. Showing additional positions can cause the images of the remote attendees to be so small that the natural collaboration cues useful in the formation of a blended space environment are lost. When this happens, the field of view of the remote studio image can be adjusted to limit the number of attendees who are "on-camera" to maintain the blended space environment.

The UI 150 permits people locations that are "on-camera" and "off-camera" to be distinguished graphically. For instance, iconic seating locations, matching the number of seats in each respective studio, can be highlighted or dimmed to indicate which seat locations will be viewable in the people displays. In an exemplary embodiment where each collaboration studio has a six-seat conference table, the UI defaults to a 4 people configuration in which only the four center positions on a six-seat conference table are on-camera, while the two end positions are off-camera and voice only. For instance, each remote studio icon 170 shown in FIG. 4 has four center on-camera positions 172 and two off-camera positions 174. As the same display limitations apply to the video image of the local studio being sent to the remote studios, the local studio icon 160 also has four center on-camera positions 162 and two off-camera positions 164. The distinguishing of the on-camera positions and the off-camera positions in the UI helps users understand, even before final connections have been established, what size of group to expect when the collaboration event initiates. The UI can also enable users to understand if there are additional users at locations which they can hear, but can not see on the display.

Figure 5:
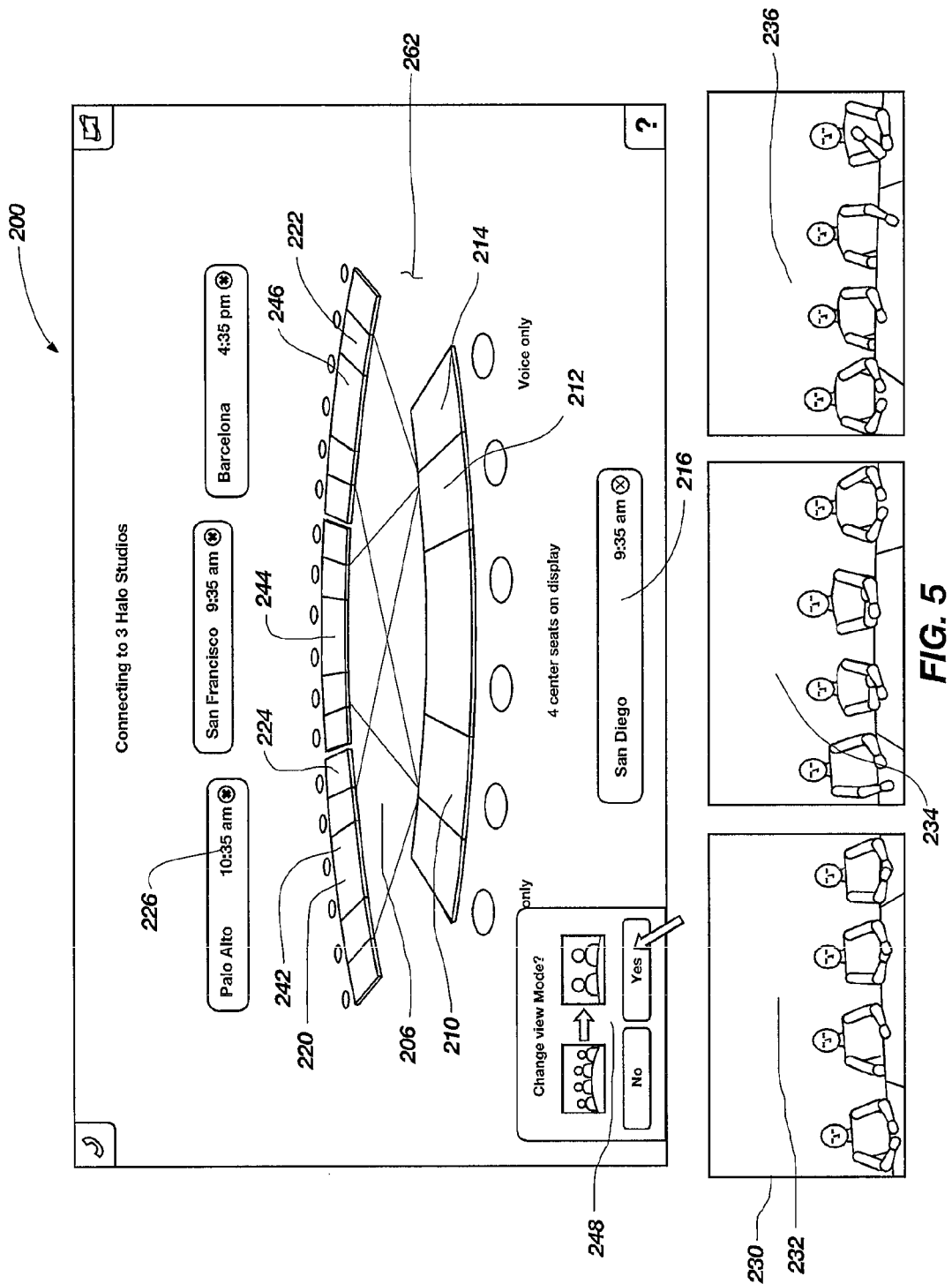
FIG. 5 illustrates the establishment of a video conference collaboration event with multiple remote video conference studios, as portrayed by the User Interface and displayed on multiple people monitors, in accordance with an embodiment of the present invention.

The UI 200 illustrated in the exemplary embodiment of FIG. 5 shows a virtual meeting space 202 after connections have been established with three remote studios. While simple and intuitive in appearance, the virtual meeting space still provides all the information necessary for local attendees to know other participants involved in the video conference.

The local studio icon 210 anchors the virtual meeting space while communicating to the local attendees who is on-camera 212 and who is off-camera 214 and voice only, and a local location text screen 216 confirms the location and current time of the local studio. Moreover, each remote studio icon 220 also depicts the on-camera 222 and off-camera 224 positions in those studios, and is further accompanied by a remote location text screen 226 that details the location and local time for each remote collaboration studio.

The UI 200 also provides feedback in the form of a connection animation sequence that provides confirmation to the meeting organizer sending invites that the invites have been sent, and that connections are occurring with the remote studios before people actually show up on display and audio. As connections are being made an animated sequence of connection graphics (not shown) can be produced to visually join the local studio icon 210 with the remote studios invited to the meeting. The animated connection sequence may take substantially any desired form. In an exemplary embodiment of the present invention, the animated connection sequence can be shown by arrows or lines going back and forth between the local studio icon and the remote studio icons 220 during the period of time when connections are being made. The connection can be displayed as a solid connection icon 206 once the connection is established. Furthermore, any metaphorical representation of the connection process that is displayed in the virtual meeting space, such as using color or texture to signal connection status, is considered to fall within the scope of the present invention.

The geometric positions of the remote studio icons 220 relative to the local studio icon 210 can intuitively communicate which remote collaboration studio is presented in which video image. For example, it is likely to be readily apparent to a first-time attendee that the center video image 234 comes from the collaboration studio identified by the center remote studio icon 244. The geometric position between the center remote studio icon and the local studio icon in the user interface is configured to be substantially similar to the relative relationship between the center video image and the local attendees. In a similar fashion, all relative relationships within the virtual meeting space in the UI 200 are configured to mimic the relative relationships in the local studio, such that the left remote studio icon 242 is paired the left video image 232, and the right remote studio icon 236 identifies the right video image 246.

Thus, in one embodiment of the present invention, the UI 200 allows for a spatial orientation map that enables meeting attendees to have a spatial awareness that can reduce the disassociation typically present in a teleconference with a plurality of remote studios. Creating a virtual meeting space occupied by iconic sections of tables, arranged in an order matching the corresponding display of people from those locations, and seats representing who is and who is not on-camera in a meeting, together combine to produce a blended-space overview that indicates, in a very tangible way, which seats from which locations are currently on-camera. The present invention helps resolve the problem of user confusion present in multiparty video teleconferencing caused by the inability of attendees to comprehend a clear sense of the 'space' that they and the other meeting attendees occupy and who is where in that space.

When the last remote studio has joined the video conference collaboration event a Change View Mode pop-up 248 can automatically appear, prompting the meeting organizer to stay in 4 people mode or switch to 2 people mode, also known as the full-size people mode. In the 2 people configuration, the field of view of each studio can be narrowed to the center two positions at the conference table in each collaboration studio. The Change View Mode pop-up may time out if no choice is made, and can be redisplayed by clicking on a view mode icon located on the UI screen.

Figure 6:
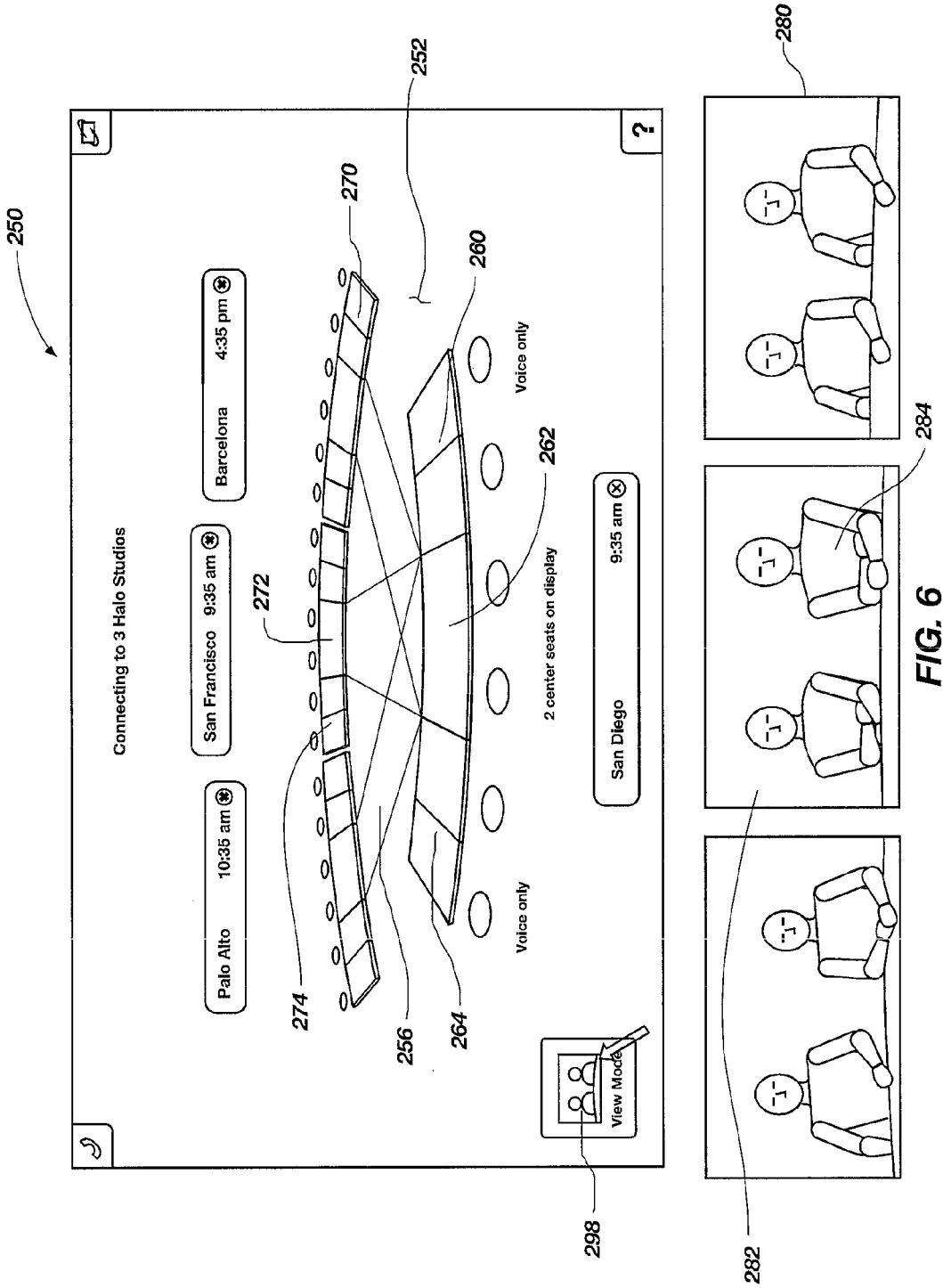
FIG. 6 illustrates a full-size people mode video conference collaboration event with multiple remote video conference studios, as portrayed by the User Interface and displayed on multiple people monitors, in accordance with an embodiment of the present invention.

As shown in FIG. 6, switching to 2 people mode can cause the field of view of each studio to zoom into the two center positions at each conference table. Because the people displays 280 in the local studio are typically large, narrowing the field of view of the video image 282 can result in the two center remote studio attendees 284 appearing with a near life-size image. Displaying remote attendees with a likeness equivalent to their true size further enhances the blended space environment, since each individual is portrayed as if they were actually present in the conference studio. This facilitates natural collaboration cues and non-verbal communication over and above that found in standard teleconference video images and audio feeds, providing a significant improvement.

The UI 250 can also change during the transition to 2 people, or full-size people, mode. The size and position of the local studio icon 260 and the remote studio icons 270 within the virtual meeting space 252 can remain the same, but the on-camera positions for each icon, 262 and 272 respectively, are re-sized to reflect the narrower field of view, while at the same time the size of the off-camera positions, 264 and 274, are expanded. Likewise, the width of the connection icons 256 can be updated to indicate the narrower field of the video images shared between the collaboration studios. The view mode icon 298 can be displayed to allow the configuration to be switched back to 4 people mode if so desired.

Figure 7:
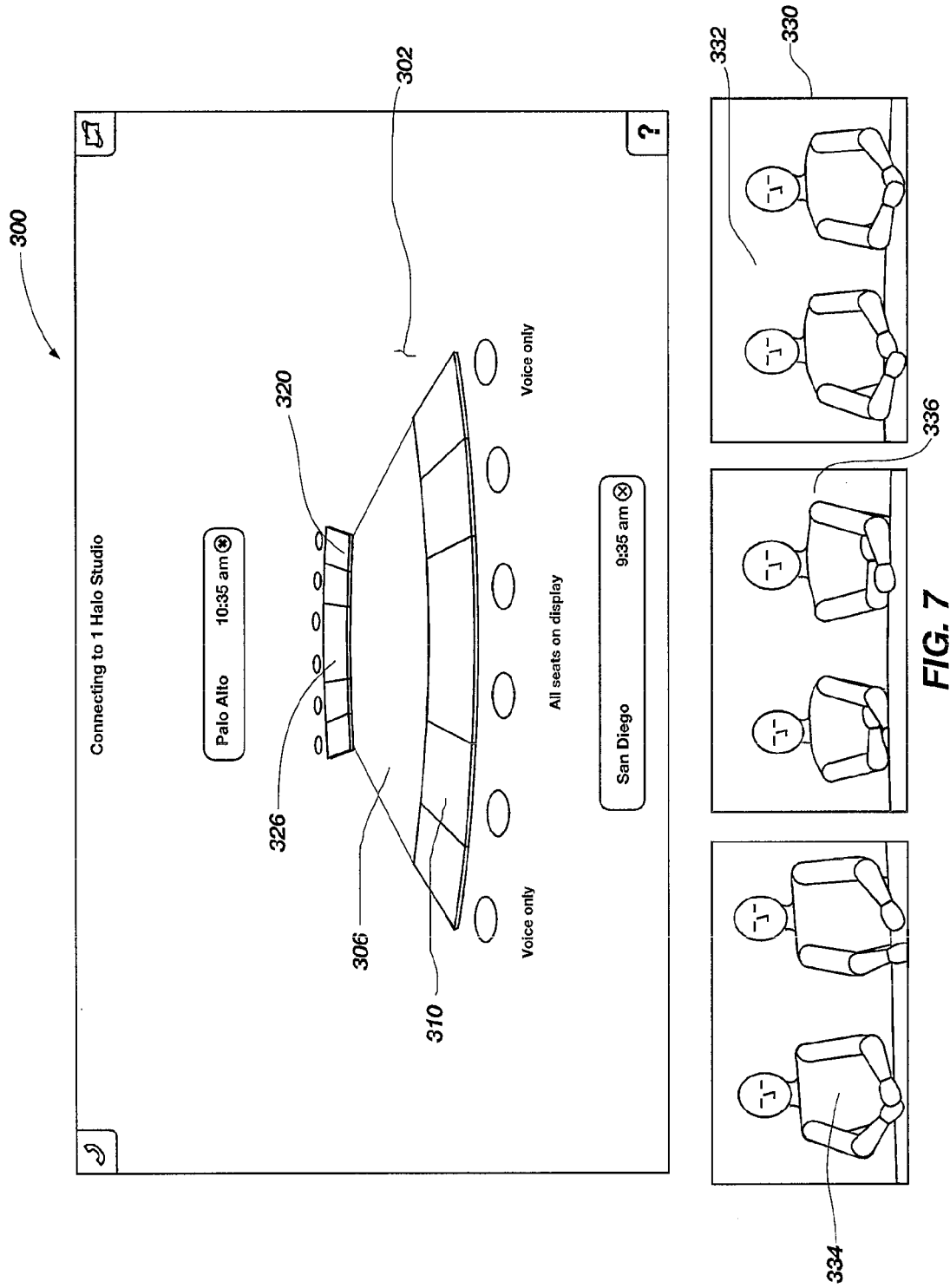
FIG. 7 illustrates a full-size people mode video conference collaboration event with one remote video conference studio, as portrayed by the User Interface and displayed on multiple people monitors, in accordance with an embodiment of the present invention.

FIG. 7 illustrates an embodiment illustrating a UI 300 in which the meeting organizer can choose to initiate a 2 point event after the first remote studio is selected, or in the alternative, a 2 point event can be achieved after other remote studios drop off a multi-point video conference. In either case, in a 2 point collaboration event the three people displays 330 can be sufficient to portray life-size images of each position at the opposing conference table when the video images 332 of each people display are focused on just two remote attendees 334. Within the UI, the virtual meeting space 302 is defined by the local studio icon 310 and the remote studio icon 320. All seat positions on both icons are highlighted to illustrate that all positions at each conference table are on-camera. Here again, the graphical presentation of the blended space on the UI provides a spatial orientation map that can be easily understood by users. Similar with the 4 point collaboration event, the center people display 336 is intuitively associated with the center on-camera section 326 of the remote studio icon, as are the end people displays with the end sections of the icon.

Figure 8:
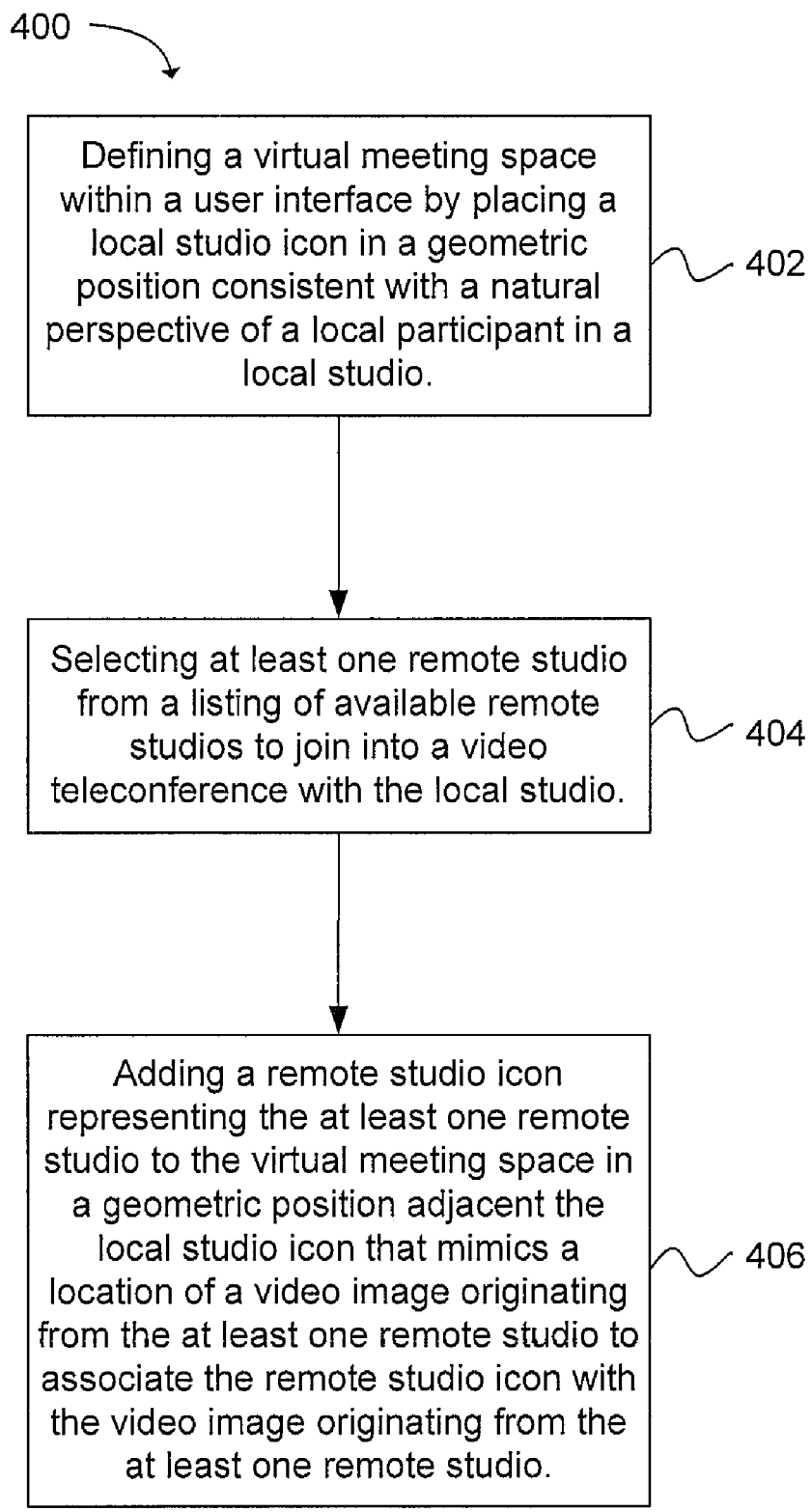
FIG. 8 is a flow chart describing a method of an exemplary embodiment of the user interface, in accordance with an embodiment of the present invention.

In another embodiment, as shown in FIG. 8, a method 400 for initiating and controlling a video conference collaboration event between a plurality of video conferencing studios is disclosed. The method provides for defining 402 a virtual meeting space in the user interface by placing a local studio icon in a front and center location on the control display such that the geometric position of the local studio icon is consistent with the natural perspective of a local participant in the local video conferencing studio. A remote studio can then be invited to join the local studio in a video collaboration event by selecting 404 the remote video conferencing studio from the listing provided by the video conferencing studio directory. The method further provides for adding 406 a remote studio icon to the user interface adjacent the local studio icon in a position that mimics the location of a video image originating from the selected remote studio. This allows the local participants in the local video conferencing studio to intuitively associate the remote studio icon with the video image originating from the selected remote video conferencing studio, even before the video image has appeared on the people display.

In the exemplary embodiment, furthermore, steps 404 and 406 may be repeated once or twice by the meeting organizer to select an additional one or two remote video conferencing studios, thus allowing the total possible number of remote studios involved in the video collaboration event to range between one and three. However, nothing in the exemplary method of the present invention should be used to limit the potential number of remote video conferencing studios involved in any video collaboration event. With appropriately configured video conferencing studios, four or more remote video conferencing studios could also be selected from within the UI and still fall within the scope of the present invention.

In additional aspects of the present invention, the UI allows for invitation usability by mapping the remote studio icons to their respective people displays, thereby setting up invitations that clearly communicate to the local participants in advance which displays their meeting attendees will occupy. The ordering can be a default sequence, or customized during invitation to rearrange attendees to match user-preference table locations for the meetings.

In another embodiment the method can further include using a table top image for both the local and remote studio icons to better portray the metaphor of a virtual meeting space having virtual conference tables. The table top image can be curved, and a series of seat images may be positioned on the convex side of the curved table top image to provide the icons with a sense of direction. Finally, the virtual meeting space can be arranged such that the local studio icon and the remote studio icons are on located on opposite sides of the meeting space, facing each other. In an alternative embodiment, the local studio icon and the remote studio icons can be positioned around the circumference of the virtual meeting space, with all icons facing inwards towards the center.

In yet another embodiment of the invention, the status of the communications connection between the local studio and the remote studios can be represented by adding an animated connection sequence to the virtual meeting space. The animated connection sequence employs connection icons, such as arrows or an illuminated bars, which are animated in one form while communications are being set up, and animated in a second form after the connections are established. For example, the arrows can travel back and forth between the icons or the illuminated bars can pulse when communications are in the process of being established, and then either the arrows or the illuminated bars are displayed as solid connection icons once the communications connections are completed.

In yet another embodiment of the invention, select participants in the remote studios can be displayed with a substantially life-size likeness on a people display by narrowing the field of view of the video image originating from the remote studio. The field of view in full-size people mode is generally limited to the two center positions at the remote studio conference table, but the field of view can be panned from side to side to display other remote participants if required. The changing of the field of view is reflected in the UI by updating the connection icons to reflect the broader or narrower focus. For instance, the width of the arrows or illuminated bars can be expanded or narrowed to automatically indicate the breadth of the field of view of the remote video image to attendees in the local studio.

In yet another embodiment, the UI animated graphics sequences can be provided by interface software code. The interface software code can run on a server system accessible by each of the local and remote locations, which server system can additionally provide processing and storage to drive the code and display and enable connection to the network and an event manager. Moreover, the interface software code can send instructions to the event manager on the network for establishing a video collaboration event, and likewise the interface software code can receive information from the event manager regarding the availability and connection status of the remote studio locations.

While the UI has been illustrated within the video conferencing studios, the UI may also be used in locations outside the studios. For example, a user may use the user interface on his laptop while traveling. The user interface can be used to set up a remote meeting to take place at some future time. Thus, use of the UI is not limited to real time use in the conferencing studios.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Accordingly, it is not intended that the invention be limited, except as by the claims set forth below.

What is claimed is:

1. A method for initiating and controlling a video conference collaboration event between a plurality of video teleconference studios comprising:
   defining a virtual meeting space within a user interface by placing a local studio icon in a geometric position consistent with a natural perspective of a local participant in a local studio;
   selecting at least one remote studio from a listing of available remote studios to join into a video teleconference with the local studio; and
   adding a remote studio icon representing the at least one remote studio to the virtual meeting space in a geometric position adjacent the local studio icon that mimics a location of a video image originating from the at least one remote studio to associate the remote studio icon with the video image originating from the at least one remote studio.

2. The method of claim 1, further comprising representing the local studio icon and the at least one remote studio icon with a table top image.

3. The method of claim 2, further comprising providing the table top image with a sense of direction by curving the table top image and adding at least one seat image adjacent the table top image.

4. The method of claim 1, further comprising viewing the virtual meeting space using a three-dimensional perspective.

5. The method of claim 1, further comprising illustrating a communications connection between the local studio and the at least one remote studio by adding a connection icon to the user interface.

6. The method of claim 5, further comprising signaling a status of the communications connection between the local studio and the at least one remote studio by animating the connection icon.

7. The method of claim 6, further comprising animating the connection icon by intermittently displaying the connection icon to signal a process of establishing a connection and continuously displaying the connection icon to signal an active connection.

8. The method of claim 5, further comprising portraying at least one remote participant having a substantially life-size likeness on the video image from the at least one remote studio by narrowing the field of view of the video image from the at least one remote studio.

9. The method of claim 8, further comprising portraying a plurality of remote participants having a less than life-size likeness on the video image from the at least one remote studio by expanding the field of view of the video image from the at least one remote studio.

10. The method of claim 9, further comprising signaling the expanded or narrowed field of view of the video image from the at least one remote studio by expanding or narrowing the width of the connection icon.

11. The method of claim 5, further comprising representing the connection icon as an illuminated bar.

12. A user interface for initiating and controlling a video conference collaboration event between a plurality of video teleconference studios, said user interface comprising:
   a means for defining a virtual meeting space consistent with a natural perspective of a local participant in a local studio;
   a means for inviting at least one remote studio to join a video teleconference with the local studio; and
   a means for representing the at least one remote studio in the virtual meeting space that mimics a location of a video image from the at least one remote studio to associate the remote studio with the video image from the at least one remote studio.

13. The user interface of claim 12, further comprising a means for viewing the virtual meeting space using a three-dimensional perspective.

14. The user interface of claim 12, further comprising a means for signaling a status of a communications connection between the local studio and the at least one remote studio.

15. The user interface of claim 14, further comprising a means for narrowing a field of view of the video image from the at least one remote studio to portray at least one remote participant having a substantially life-size image.

16. The user interface of claim 15, further comprising a means for expanding the field of view of the video image from the at least one remote studio to portray a plurality of remote participants having a less than life-size image.

17. The user interface of claim 16, further comprising a means for portraying in the user interface the expanded or narrowed field of view of the video image from the at least one remote studio.

18. A non-transitory computer readable medium having computer readable program code embodied in said medium, and when executed, implementing a method for initiating and controlling a multi-point video teleconference between a plurality of video teleconference studios, said computer readable program code comprising:
   define a virtual meeting space in a user interface by placing a local studio icon representing a local studio in a geometric position consistent with a natural perspective of a local participant in a local studio;

select at least one remote studio from a listing of available remote studios to invite to join into a video teleconference with the local studio; and add a remote studio icon representing the at least one remote studio to the virtual meeting space in a geometric position adjacent the local studio icon that mimics a location of a video image originating from the at least one remote studio to associate the remote studio icon with the video image originating from the at least one remote studio.

19. The non-transitory computer readable medium of claim 18, further comprising a computer readable program code to illustrate a communications connection between the local studio and the at least one remote studio location by adding a connection icon between the local studio icon and the at least one remote studio icon.

20. The non-transitory computer readable medium of claim 19, further comprising a computer readable program code to illustrate a status of the communications connection between the local studio and the at least one remote studio by animating the connection icon.

21. A method for controlling a video teleconference collaboration event between a local studio and at least one remote studio, the method comprising:

displaying video streams received from the at least one remote studio on displays located in the local studio;

defining a layout of the video streams as the video streams are displayed in the local studio; and placing icons that correspond to each of the video streams in a layout on a user interface, wherein the layout on the user interface mimics the defined layout of the video streams to which the icons correspond.

22. The method of claim 21, further comprising:

placing an icon that represents the local studio on the user interface in a geometric position consistent with a natural perspective of a local participant in the local studio.

* * * * *